C. K. TRIPP.
MANDREL AND THE LIKE.
APPLICATION FILED NOV. 1, 1916.
1,267,146.
Patented May 21, 1918.
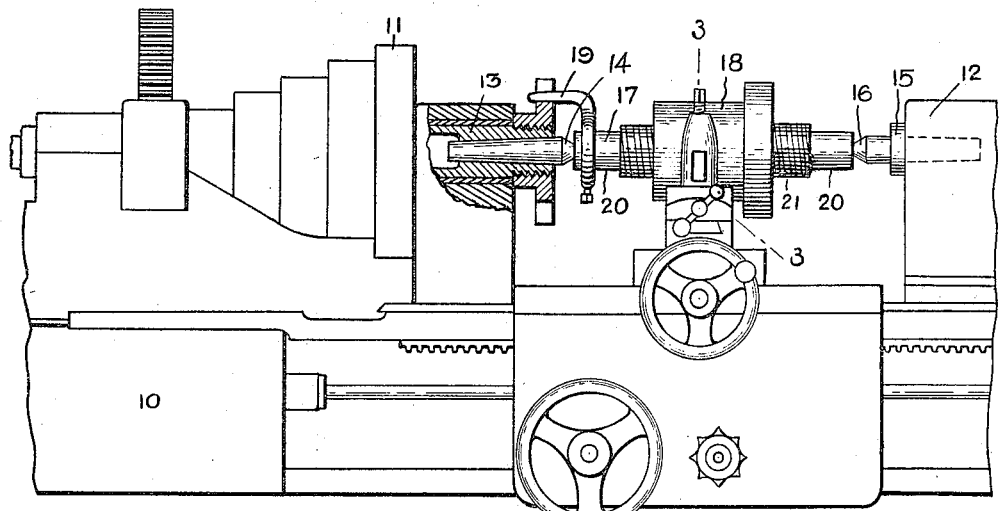
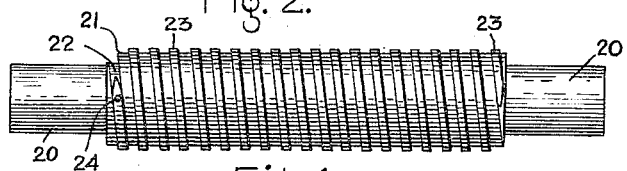
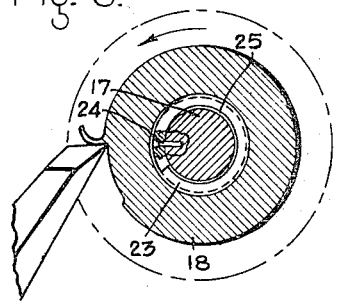
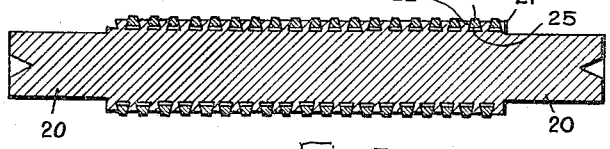
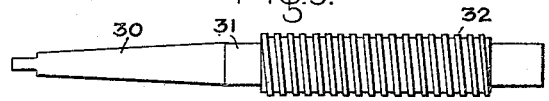
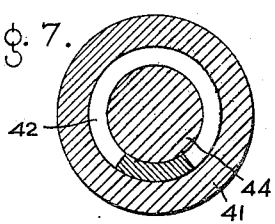
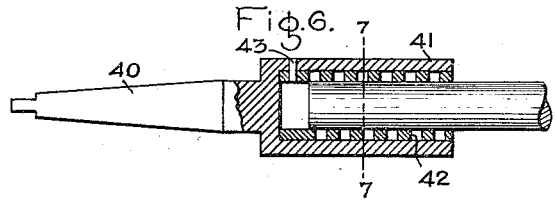
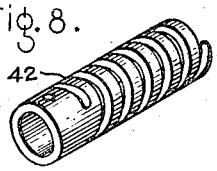
Inventor,
Charles K. Tripp,
by
Att'y.

UNITED STATES PATENT OFFICE.

CHARLES K. TRIPP, OF LYNN, MASSACHUSETTS, ASSIGNOR TO GENERAL ELECTRIC COMPANY, A CORPORATION OF NEW YORK.

MANDREL AND THE LIKE.

1,267,146.  Specification of Letters Patent.  Patented May 21, 1918.

Application filed November 1, 1916. Serial No. 128,894.

*To all whom it may concern:*

Be it known that I, CHARLES K. TRIPP, a citizen of the United States, residing at Lynn, county of Essex, State of Massachusetts, have invented certain new and useful Improvements in Mandrels and the like, of which the following is a specification.

The present invention relates to mandrels and the like, and has for its object to provide an improved structure in an apparatus of this character.

For a consideration of what I believe to be novel and my invention, attention is diricted to the accompanying specification and the claims appended thereto.

In the accompanying drawings, Figure 1 shows a portion of a lathe having mounted therein a mandrel carrying a piece of work, which mandrel embodies my invention; Fig. 2 is a side view of the mandrel; Fig. 3 is a section taken on line 3—3, Fig. 1; Fig. 4 is a longitudinal section of the mandrel; Fig. 5 shows a modification in which the invention is applied to a form of mandrel different from that of Figs. 1 to 4, and Figs. 6, 7 and 8 show another form of my invention, Fig. 6 being a side elevation partly in section, Fig. 7 a section taken on line 7—7, Fig. 6, and Fig. 8 a perspective view of one of the parts.

Referring to the drawings, Fig. 1, 10 indicates generally a lathe provided with the usual head-stock 11 and tail-stock 12. 13 indicates the live spindle which carries the live center 14, and 15 the dead spindle carrying the dead center 16. 17 indicates a mandrel embodying my invention upon which a piece of work 18 is fastened. The mandrel is fastened to the live spindle by a lathe dog 19 so as to turn therewith.

Referring now to Figs. 2, 3 and 4, the mandrel comprises a bar having its two ends turned down slightly as indicated at 20 so as to provide a central body 21 of larger diameter than the two ends. In the central body 21 a spiral helical groove 22 is cut, the same being preferably undercut or dovetailed as shown. In the groove 22 is a spiral spring 23. The spring has one end fastened, as by pin 24, to the bar and the other end is left free. It may be inserted in the groove by screwing it in from one end. The spring 23 in cross-section has the same contour as the groove 22, except that it is smaller so that it may have a certain amount of radial play, and may thus expand and contract according to the tension. The arrangement is preferably such that when perfectly free the spring assumes a position where its outer surface is about flush with the surface of the body 21. When placed under tension, however, it may expand radially so that the turns project beyond the surface of body 21, the sides of the spring then engaging the undercut sides of the groove 22. This is shown in Fig. 4 where it will be seen that the turns of the spring project beyond the surface of the body 21 leaving a space, as indicated at 25, between the inner surface of the turns of the spring and the bottom of the groove.

The body 21 of the mandrel is made substantially the size of the opening in the work to be machined so that it will just slip into such opening. In use the mandrel is inserted into the opening in the work by pushing the one relative to the other and at the same time giving a relative twisting motion to the work and mandrel in a direction to wind the spring 23 into the groove 22, the end of the mandrel at which the free end of the spring is located being inserted. By this combined turning and forcing motion the turns of the spring are brought down flush with the surface of body 21 and the mandrel readily inserted into the opening in the work. As soon as the twisting ceases the coils of the spring engage the surface of the opening in the work gripping it more or less firmly, depending on the fit in the particular instance, and the amount which the coils tend normally to project beyond the surface of the body of the mandrel. The mandrel is then placed in the lathe in the usual manner and so as to rotate in a direction opposite to that in which the threads of the spiral groove run. When the cutting tool engages the work there will be immediately a force tending to turn the work relative to the mandrel in a direction to unwind the spring 23 and this will bring the outer surfaces of the coils into firm gripping engagement with the work. After the cutting operation is completed the mandrel is readily removed by a twisting and pulling action, the twisting being in a direction to wind up the coils of the spring, as when inserting the mandrel.

The mandrel has the advantage that it can be very quickly inserted into and removed from the work entirely by hand. It also has the advantages that the friction necessary to hold the work is distributed over the entire area of it so that an excessive strain is not placed at any one point and that it grips the work according to the operation being performed on it, the harder the cutting tool presses on the work, the firmer the gripping action. In view of this, its use is particularly advantageous in machining very thin tubing as it will be held evenly and the spring can only bind enough to do the necessary machining. The work will, therefore, naturally be concentric.

The arrangement also has the advantage in the case of machining tubes of insuring that the inner and outer surfaces of the tubes will be concentric, even if the hole in the work is larger than the mandrel, for the reason that the tool will press the work toward the mandrel. Furthermore, should the hole in the work be bored large the tendency will be toward cutting the work large rather than small because the tool continually pushes the work toward the mandrel.

In Fig. 5 is shown a form of the invention, the arrangement being the same as in Figs. 2 to 4, except that the mandrel is provided with a shank 30 adapted to slip directly into the head-stock of the lathe. 31 indicates the body of the mandrel and 32 the coiled spring. With this arrangement the work will be put on and removed from the mandrel without removing the mandrel from the head-stock of the lathe.

Figs. 6, 7 and 8 show an embodiment of the invention somewhat in the nature of a chuck and which is used for gripping a rod for turning in a lathe or for other purpose. 40 indicates a shank adapted to be inserted into the head-stock of a lathe and 41 a tubular member formed integral therewith. Inside the tubular member is a flat helical spring 42. It is fastened at its inner end by a pin 43 and the outer end is free. Fig. 8 shows the spring 42 in perspective. It may be cut from a suitable piece of tubing. Its outer diameter is substantially that of the inner surface of the member 41 and its inner diameter is about that of the piece or work to be gripped. In Figs. 6 and 7, 44 indicates the end of a rod which may be, for example, a piece of material upon which a cutting operation is to be performed. To insert it into the chuck the end of the rod is placed at the entrance of the opening and the rod is pushed and at the same time given a twisting motion in a direction to unwind the coil of the spring 42. This causes the spring to expand and let the rod move inside the coils. As soon as the rod is in place a twist of the rod in the opposite direction tightens the coil of the spring about it, and, as will be obvious, the greater the twisting force the tighter it will be gripped. The rod is readily removed by twisting it in a direction to unwind the coils of the spring at the same time pulling on it. It will be seen that the general operation is the same as in the cases of the other forms shown, except that it is reversed. In the arrangement just described the coils of the spring are not arranged in a spiral groove as in the other modifications but, as will be obvious, I may so arrange them if desired.

While I have described my invention as applied primarily to lathe parts, it will be understood that it is not necessarily limited thereto, but that it may be applied in various instances where a gripping of two parts together by a turning movement is desired.

In accordance with the provisions of the patent statutes, I have described the principle of operation of my invention, together with the apparatus which I now consider to represent the best embodiment thereof; but I desire to have it understood that the apparatus shown in only illustrative, and that the invention can be carried out by other means.

What I claim as new and desire to secure by Letters Patent of the United States, is:

1. In an apparatus of the character described, the combination of a member having an annular surface, a coiled spring thereon, and means for fastening one end of the spring to the member, the other end of the spring being free, whereby when the coils of said spring and the member are turned relative to each other, a turning movement in one direction will expand the spring and a turning movement in the other direction will contract it.

2. A gripping device comprising a member having an annular surface and a spiral spring loosely engaging it, one end of the spring being fastened to the member and the other end free, whereby when the coils of said spring and the member are turned relative to each other, a turning movement in one direction will expand the spring and a turning movement in the other direction will contract it.

3. In an apparatus of the character described, the combination of a member having an annular surface with a spiral groove therein, and a spiral spring in the groove, one end of the spring being fastened to the member and the other free, whereby when the coils of said spring and the member are turned relative to each other, a turning movement in one direction will expand the spring and a turning movement in the other direction will contract it.

4. In an apparatus of the character described, the combination of a member having an annular surface with a dove-tailed spiral groove therein, a coiled spring of substantially the same contour in section as the groove mounted loosely therein, and means for fastening one end of the spring to the member, the other end being free.

5. A mandrel comprising a body portion, and a spiral spring thereon, said spring being fastened to the body portion at one end and free at the other, whereby when the coils of said spring and the body member are turned relative to each other, a turning movement in one direction will expand the spring and a turning movement in the other direction will contract it.

6. A mandrel comprising a bar having a spiral groove in its surface, and a flat spring in said groove, one end of the spring being fastened to the bar and the other end free, said spring being of such size that when twisted in a direction to wind it up it becomes of lesser diameter than the bar and when twisted in a direction to unwind it it becomes of greater diameter than the bar.

7. The combination with two members having adjacent concentric annular surfaces, of a gripping means for them comprising a spiral spring arranged between them with one end attached to one of the members and the other free, whereby when said members are turned in one direction relative to each other the spring will be expanded to grip the members together and when turned in the opposite direction it will be contracted to release them.

8. The combination with a gripping member and a member to be gripped, said members having annular surfaces adapted to be brought into concentric relation to each other, of means for gripping said members together when they are subjected to a turning movement relative to each other comprising a spiral spring carried by the gripping member and fastened thereto at one end, the other end being free.

9. The combination with a gripping member and a member to be gripped, said members having annular surfaces adapted to be brought into concentric relation to each other, of means for gripping said members together when they are subjected to a turning movement relative to each other comprising a spiral spring embedded in a spiral groove in the surface of the gripping member and fixed thereto at one end, whereby when said members are turned in one direction relative to each other the spring is expanded to grip them together, and when turned in the opposite direction it is contracted to permit them to be drawn apart.

In witness whereof, I have hereunto set my hand this thirtieth day of October, 1916.

CHARLES K. TRIPP.

Copies of this patent may be obtained for five cents each, by addressing the "Commissioner of Patents, Washington, D. C."